United States Patent Office 2,762,798
Patented Sept. 11, 1956

2,762,798

CYANURIC CHLORIDE

Norman L. Hardwicke and George W. Walpert, Texas City, Tex., assignors to Monsanto Chemical Company, St. Louis, Mo., a corporation of Delaware No Drawing. Application December 31, 1954,
Serial No. 479,226

2 Claims. (Cl. 260—248)

This invention relates to a method for the production of cyanuric chloride by means of the vapor-phase, catalytic reaction of hydrogen cyanide and chlorine.

Both liquid and vapor-phase methods for the preparation of cyanuric chloride are known. However, the more common and better developed of these employ cyanogen chloride as the starting material. The cyanogen chloride is polymerized either in the liquid phase as described, for example, in U. S. Patents 2,416,656, 2,417,659 and 2,692,880 or in the vapor phase as disclosed, for example in U. S. Patents 2,414,655 and 2,491,459. The only references to the production of cyanuric chloride from hydrogen cyanide and chlorine are those which describe the liquid phase reaction such as that of passing chlorine into a solution of anhydrous hydrogen cyanide in chloroform as found, for example, in Berichte, 32 692. No vapor-phase methods have been described although the manufacture of cyanogen chloride from hydrogen cyanide and chlorine in the vapor phase is disclosed in the art.

It has now been discovered that cyanuric chloride may be produced directly in a one-stage operation from hydrogen cyanide and chlorine. According to this invention, hydrogen cyanide and chlorine are reacted together in the vapor phase at elevated temperatures in the presence of a fluidized activated carbon catalyst and cyanuric chloride of excellent purity is recovered from the reaction mixture by sublimation. The process of the invention is one of the so-called fluid catalyst type. In this technique, catalyst solids of small particle size are fluidized by upflowing gasi-form materials, in this case hydrogen cyanide and chlorine, within the reaction zone so that the catalyst in the zone is maintained as a turbulent liquid-like dense phase. The extreme turbulence of the suspended catalyst particles permits maintenance of uniform temperatures throughout the entire mass of catalyst.

The advantages of the process over the processes of the prior art are immediately obvious. No organic solvents are required and the difficulties of recovering solvents are avoided. The hazards previously encountered in handling the reaction mixtures obtained in liquid phase polymerizations are eliminated. The product obtained is of extremely high purity and the cumbersome equipment and complex handling operations inherent in both production and purification in liquid-phase processes are supplanted by the simpler, more efficient apparatus and methods of the process of the invention.

The following example illustrates the nature of the invention but is not intended to limit it in any manner except as it is limited in the appended claims.

Example

A laboratory-scale version of the conventional type of reactor employed in fluid catalyst processes was used. This consisted essentially of a glass cylinder, two inches in outside diameter and approximately 50 inches in height, the latter measurement including a "disengaging section" of some 30 inches in height. Heat was supplied to the reactor by means of electrical windings covered by the necessary insulation over the entire length of the reactor. The reactor contained a fluidized bed of approximately 20 inches of activated carbon catalyst ground to a particle size in the range from 75 to 600 microns. The catalyst was heated to a temperature of 200° C. and purged with nitrogen for a period of about 10 minutes. Then hydrogen cyanide and chlorine gas, after passing through calibrated flowmeters, were introduced in an approximately 1:1 mole ratio at a rate of 4.6 and 4.9 cu. ft. per hr. respectively through a fritted glass disc at the bottom of the reactor and passed upwardly into contact with the carbon catalyst. The catalyst was maintained in the fluidized state by adjustment of the inlet velocity of the entering gases. Since the reaction is a highly exothermic one, the temperature rose sharply as the reactants passed through the catalyst bed and external heating was regulated to maintain the temperature of the catalyst bed within the range from about 425° C. to about 435° C., while the pressure in the reaction zone was essentially atmospheric. The effluent vapors from the top of the reactor were passed into an air-cooled sublimation chamber where the crystalline solid cyanuric chloride was collected. Generally, the first solid material began to appear in the sublimation chamber when the temperature in the reactor came within the range from about 350° to 370° C. Yield data obtained in several runs made in the manner just described are tabulated below.

| Run | Length of Run (min.) | Ave. Temp. (° C.) | Cyanuric Chloride Produced (g.) | Yield Based on HCN (percent) |
|---|---|---|---|---|
| A | 132 | 430 | 670 | 85 |
| B | 77 | 430 | 393 | 85.1 |
| C | 180 | 430 | 900 | 83.3 |

Assays of the cyanuric chloride product by melting point indicated that it was 99+% pure.

While the example represents a preferred embodiment of the invention, substantial variation in reaction conditions may be made without departing from the scope of the invention. The reaction temperature may vary, for example, from about 350° C. to about 1000° C. but preferably the reaction temperature is maintained in the range from about 350° to about 600° C. Little or no cyanuric chloride forms below a temperature of 350° C.

The heat required to initiate this exothermic reaction may be supplied, as indicated in the example, by initially heating the catalyst bed or by preheating the reactant gases. In either case, the initial temperature should be maintained suitably below the desired final reaction temperature and yet be high enough to initiate the reaction at a satisfactorily high velocity. The exact temperature employed will, of course, depend upon the rate of radiation or other cooling in the reactor, the space velocity of the entering gases, etc. and may be calculated for the particular conditions employed. Generally, the catalyst bed is heated to a temperature of at least 150° C. when that method is employed or, if the reactants are preheated, their temperature is regulated several hundred degrees below the desired maximum off gas temperature and space velocity is regulated within a range such that the catalyst bed remains fluidized. Space velocities in the range from 0.05 to 0.15 reciprocal seconds are usually satisfactory.

Although a slight excess of chlorine is indicated, the exact stoichiometric proportions of the hydrogen cyanide and chlorine reactants may be employed, i. e., one mole of hydrogen cyanide may be fed for each mole of chlorine fed.

The process of the invention may also be operated at elevated pressures, i. e., pressures above atmospheric, if desired.

What is claimed is:

1. A process for the preparation of cyanuric chloride which comprises reacting together hydrogen cyanide and chlorine in the vapor phase at a reaction temperature of at least 350° C. and in the presence of a fluidized activated carbon catalyst.

2. A process for the preparation of cyanuric chloride which comprises reacting together hydrogen cyanide and chlorine in a mole ratio of approximately 1:1 in the vapor phase at a reaction temperature of at least 350° C. and in the presence of a fluidized activated carbon catalyst.

References Cited in the file of this patent

UNITED STATES PATENTS

| 2,391,490 | Thurston | Dec. 25, 1945 |
| 2,491,459 | Thurston | Dec. 13, 1949 |
| 2,541,053 | Hartigan | Feb. 13, 1951 |

FOREIGN PATENTS

| 691,274 | Great Britain | 1953 |